United States Patent
Chiang et al.

(10) Patent No.: US 6,432,170 B1
(45) Date of Patent: Aug. 13, 2002

(54) ARGON/OXYGEN SELECTIVE X-ZEOLITE

(75) Inventors: Robert Ling Chiang, Basking Ridge, NJ (US); Roger Dean Whitley, Allentown, PA (US); Jane Elizabeth Ostroski, New Tripoli, PA (US); Douglas Paul Dee, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/782,265

(22) Filed: Feb. 13, 2001

(51) Int. Cl.[7] .............................................. B01D 53/047
(52) U.S. Cl. ................ 95/96; 95/116; 95/127; 95/902; 502/79
(58) Field of Search ............................ 95/96–105, 116, 95/127, 130, 902; 502/79, 347

(56) References Cited

U.S. PATENT DOCUMENTS

| | | | | | |
|---|---|---|---|---|---|
| 3,013,985 | A | * 12/1961 | Breck et al. | .................. | 502/79 |
| 3,033,642 | A | * 5/1962 | Bukata et al. | ................ | 502/79 |
| 3,181,234 | A | * 5/1965 | Breck | .......................... | 502/79 |
| 4,483,937 | A | * 11/1984 | Liu | ............................ | 502/73 |
| 4,892,567 | A | * 1/1990 | Yan | .......................... | 95/902 X |
| 4,913,850 | A | * 4/1990 | Puppe et al. | ................. | 252/630 |
| 5,226,933 | A | 7/1993 | Knaebel et al. | | |
| 5,419,891 | A | * 5/1995 | Coe et al. | ................... | 423/700 |
| 5,470,378 | A | 11/1995 | Kandybin et al. | | |

FOREIGN PATENT DOCUMENTS

JP H 10-152305 6/1998

WO WO 00/40332 7/2000

OTHER PUBLICATIONS

Wilkerson, B. E., "The Adsorption of Argon and Oxygen on Silver Mordenite", Master's Thesis, The Ohio State University (1990).

Yang, R. T., Chen, Y. D., Peck, J.D., Chen, N., "Zeolites Containing Mixed Cations for Air Separation by Weak Chemisorption–Assisted Adsorption", Ind. Eng. Chem. Res. 35, pp 3093–3099 (1996).

Hutson, N. D., Rege, S.U. and Yang, R.T., "Mixed Cation Zeolites: $Li_xAg_y$–X as a Superior Adsorbent for Air Separation", AIChE Journal 45(4), p 724–734 (1999).

Hutson, N.D., Yang, R.T., "Structural Effects on Asorption of Atmospheric Gases in Mixed Li,Ag–X–Zeolite", AIChE Journal, 46(11), pp 2305–2317 (2000).

Hutson, N.D., Reiser, B.A., Yang, R.T., and Toby, B.H., "Silver Ion–Exchanged Zeolites Y, X and Low Silica X: Observations of Thermally Induced Cation/Cluster Migration and the Resulting Effects on the Equilibrium Adsorption of Nitrogen", Chem, Mater., 12, pp 3020–3301 (2000).

* cited by examiner

Primary Examiner—Robert H. Spitzer
(74) Attorney, Agent, or Firm—Geoffrey L. Chase

(57) ABSTRACT

An AgX-type zeolite having a silver exchange level of 20-70% and a $Ar/O_2$ Henry's law selectivity ratio at 23° C. of 1.05 or greater has an optimum combination of selectivity for argon over oxygen at lower cost than higher silver exchange levels. This material can be used in oxygen VSA/PSA processes to produce oxygen at purities above 97%.

22 Claims, 2 Drawing Sheets

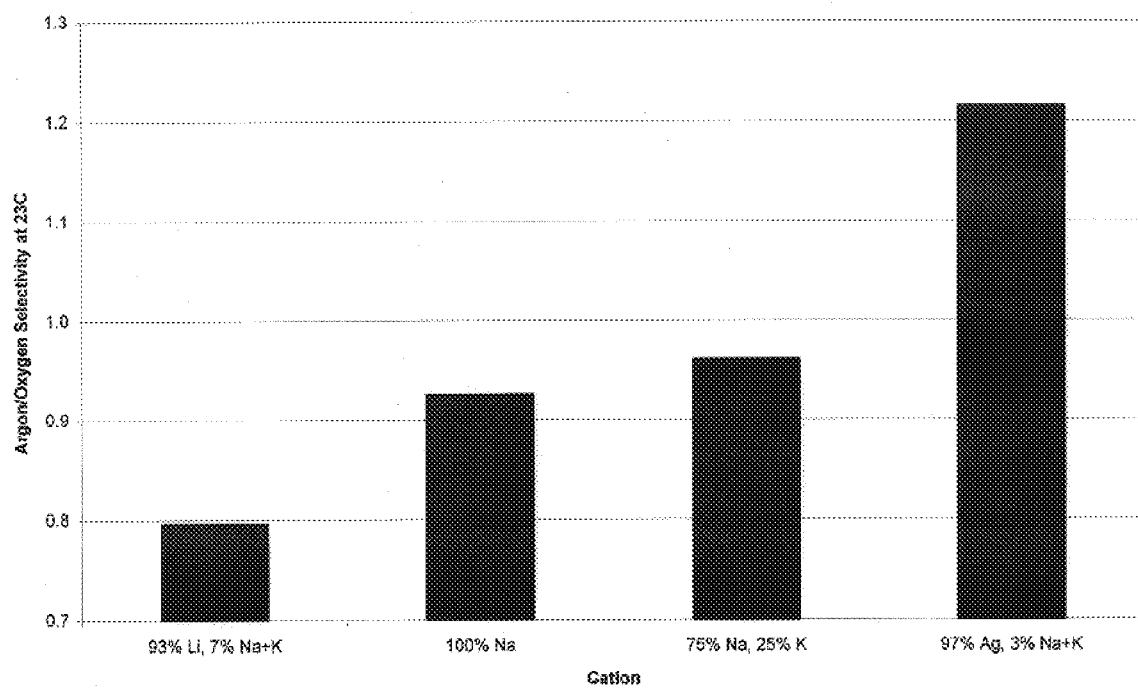

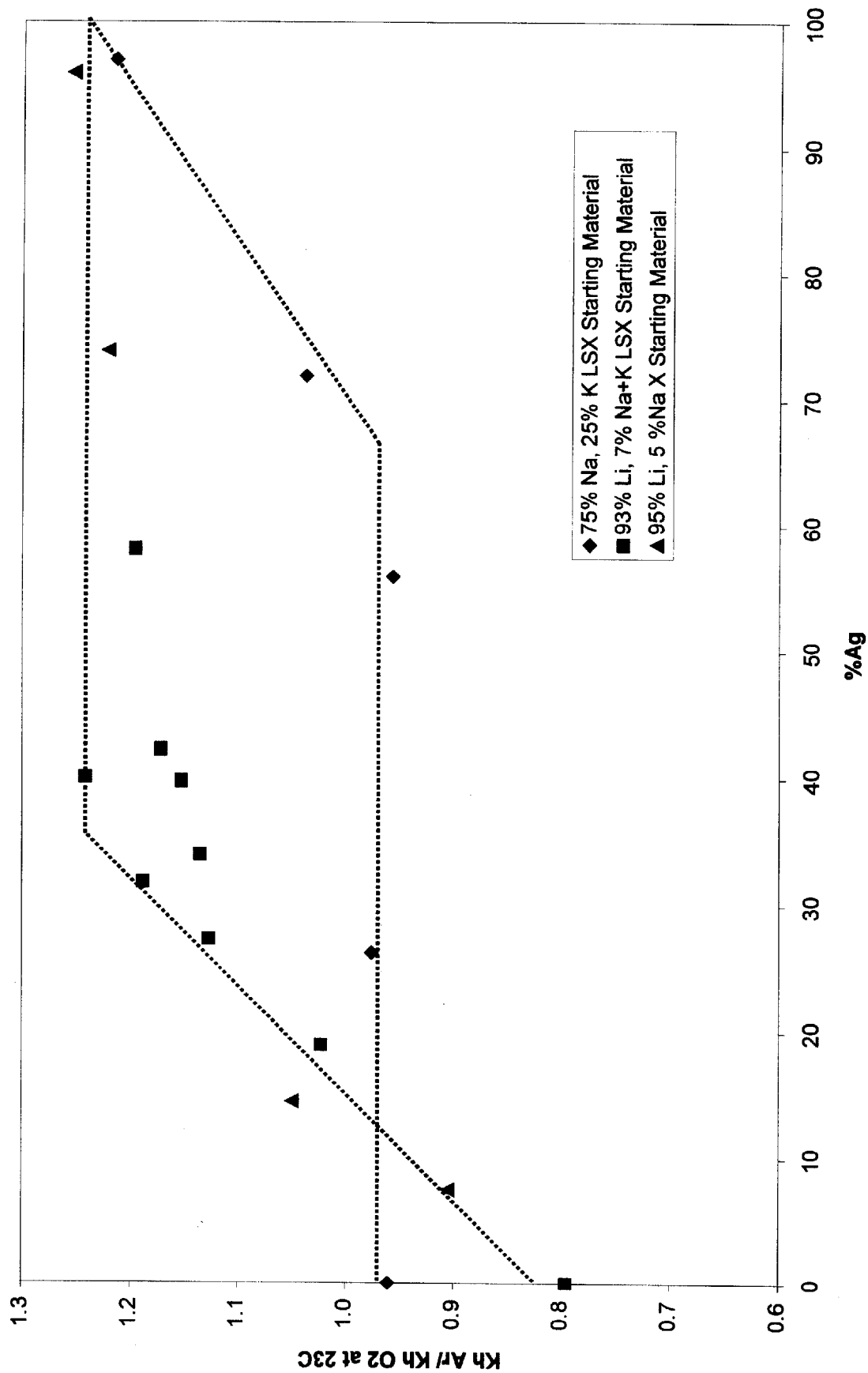

ARGON/OXYGEN SELECTIVE X-ZEOLITE

BACKGROUND OF THE INVENTION

Oxygen is used in a wide variety of processes in industry and is usually generated either by cryogenic distillation of air or by adsorptive separation of air using zeolites in a vacuum or pressure swing mode. For medical, metal cutting and small scale cylinder filling, the purity of the oxygen must be greater than 95 volume % oxygen. This level of purity has excluded traditional adsorptive separations using traditional 5A and X zeolites which adsorb nitrogen while passing oxygen and argon. Such separation processes limit oxygen concentration to approximately 95 volume % from an air or enriched air feed. Thus such markets have to be served by liquid oxygen either in Dewars or tanker trucks or by cylinders.

Pressure and vacuum swing adsorption processes have been one of the traditional methods utilized for separation of air into components to meet smaller scale production requirements. Crystalline zeolitic molecular sieves have been widely utilized in these processes taking advantage of their differential selectivity with respect to the gaseous components. A considerable technology base has been developed to alter the differential selectivity of these zeolites. For example, the cage structure of the crystalline zeolitic molecular sieves has been altered to permit selective adsorption of gases. In addition, the silicon-aluminum ratio and the type of cations present in the crystalline zeolite can affect the adsorption characteristics. Both of these properties have been modified in an effort to tailor the number of cation sites and charge characteristics of the zeolites and thereby alter the adsorption characteristics. The following references are cited to show various zeolite compositions for use in pressure and vacuum swing adsorption systems relevant to the current invention.

Wilkerson, B. E., "The Adsorption of Argon and Oxygen on Silver Mordenite", Master's Thesis, The Ohio State University (1990) discloses the use of silver mordenite as a selective adsorbent for the separation of oxygen from a feedstream of 95 volume % oxygen and 5 volume % argon. Mordenites of different silver concentrations were prepared and equilibrium isotherms of argon and oxygen at various temperatures were measured. The experimental data show that a sodium mordenite shows no selectivity between argon and oxygen, but a highly concentrated silver mordenite shows selectivity for separating oxygen from argon.

U.S. Pat. No. 5,226,933 teaches a process for making >95 volume % purity oxygen from a 95 volume % oxygen and 5 volume % argon feed by the use of silver mordenite as an adsorbent.

U.S. Pat. No. 5,470,378 discloses a process for separating argon from a feed gas comprising oxygen and argon to yield high purity oxygen at pressures between 5 and 160 psia utilizing an X zeolite where at least 80% of the available sites are occupied by silver. In the process, at least a portion of the argon in the feed gas is adsorbed by the AgX bed, thereby leaving an oxygen-enriched gas stream. The AgX zeolites are formed by ion exchanging NaX zeolite with a silver salt, such as silver nitrate, although other types of zeolites, e.g., CaX zeolite, may be used. Product gas streams of 99 volume % oxygen and less than 1 volume % argon are reported.

Application 10-152305 (1996), "Oxygen Gas Production Equipment and Oxygen Gas Production Method", Teruji, K. This article discloses the use of a silver-exchanged sodium or calcium X zeolite for producing high purity oxygen. The silver-exchanged zeolites are formed by contacting a sodium- or calcium-based X zeolite with a silver salt to a preselected silver exchange level, e.g., 10 to 100%. Argon/oxygen selectivities are achieved only at the high level of silver exchange, e.g., 90%.

Yang, R. T., Chen, Y. D., Peck, J. D., and Chen, N., "Zeolites Containing Mixed Cations for Air Separation by Weak Chemisorption-Assisted Adsorption", *Ind. Eng. Chem. Res.*, 35, pp. 3093-3099 (1996) compared the nitrogen and oxygen adsorption isotherms for approximately 85% Li, 15% NaX, ~100% AgX, and 20% AgLiNaX (called LiAgX in the reference) samples. The starting zeolite for preparing these samples was NaX (13X). Sodium X zeolites were ion exchanged to obtain lithium X and silver X zeolites as well as a mixed lithium and silver X zeolite. The lithium/silver zeolites were sequentially exchanged by first fully exchanging the sodium cations of the X zeolites with lithium cations followed by exchange of a portion of the lithium cations with silver cations to a level of approximately 20%. It was concluded that AgX zeolite is undesirable for air separation due to its $N_2/O_2$ selectivity at low pressures. The authors observed that the LiAgX sample had a higher $N_2/O_2$ selectivity than LiX above total pressure of 0.07 atm and a lower selectivity than LiX at lower total pressures. The lower selectivity at lower pressures was asserted to aid in removal of nitrogen during the regeneration part of a process cycle. Combined with a higher $N_2$ capacity for the LiAgX, the authors concluded that LiAgX was superior to LiX for air separation, under proper vacuum swing conditions.

Hutson, N. D., Rege, S. U., and Yang, R. T., "Mixed Cation Zeolites: $Li_xAg_y$-X as a Superior Adsorbent for Air Separation", *AIChE Journal*, 45(4), pp.724–734 (1999) teaches a way to improve the air separation performance of LiX type zeolites. By adding a very small amount of Ag to LiX zeolites and subjecting the resulting zeolite to proper dehydration conditions, silver clusters are formed. These silver clusters enhance the nitrogen isotherm relative to the nitrogen isotherm for LiX. Best conditions for the formation of Ag clusters were reported to be drying the Ag-containing zeolites at room temperature, followed by dehydration in vacuum at a temperature of at least 450° C., but no greater than 500° C. for a minimum of 4 hours. Oxygen and argon isotherms were provided for LiLSX (low silica X) and AgLSX. The LiLSX had an argon/oxygen selectivity of <1.0 (where the selectivity is the ratio of the slope of the isotherms at low pure gas loading) and the AgLSX had an argon/oxygen selectivity of ~1.0. Additional zeolite compositions from 1.1 to 21 silver atoms per unit cell, with the balance being primarily lithium, were made. Nitrogen and oxygen isotherms were measured on these materials. An AgX sample was also prepared to compare nitrogen isotherms with the AgLSX samples.

Yang, R. T. and N. D. Hutson, "Lithium-Based Zeolites Containing Silver and Copper and Use Thereof for Selective Adsorption", International Application, Publication WO 00/40332 presents the same samples which were discussed in Hutson et al. 1999 above. Low silica X-type zeolites (LSX) having an Si/Al ratio of 1.0 which have been subjected to appropriate cation exchange are used in the adsorption process. Several types of lithium/silver exchanged sodium X zeolites had been prepared wherein the silver exchange levels are 0.0, 1.1, 3.5, 11.5, and 21.0 atoms per unit cell out of 96 total. Two high silver sodium X zeolites, the first being AgNaLSX (95.7 silver atoms, 0.3 sodium atoms, 96 atoms/unit cell available) and the second being AgNaX (85.7 silver atoms, 0.3 sodium atoms, 86 atoms/unit cell available) were used for comparison purposes.

The silver exchanged sodium zeolites were reported as having high selectivity for nitrogen, but not preferentially selective for oxygen as compared to argon. It was suggested that the lithium/silver zeolite was most favorable for oxygen production.

Hutson, N. D. and Yang, R. T., "Structural Effects on Adsorption of Atmospheric Gases in Mixed Li,Ag-X-Zeolite", AlChE Journal, 46(11), pp. 2305-2317 (2000) presents a study based on AgLiX to determine location of Ag clusters for various activation conditions. The isotherms presented were those presented earlier (Hutson et al. 1999). In addition to the compositions disclosed in WO 00/40332, this reference discloses two additional compositions used in the structural studies; these are 2.0 atoms Ag, 0.7 atoms Na, 93.3 atoms Li (96 atoms/unit cell) and 41.8 atoms Ag, 0.2 atoms Na, 54 atoms Li (96 atoms/unit cell).

Hutson, N. D., Reisner, B. A., Yang, R. T., and Toby, B. H., "Silver Ion-Exchanged Zeolites Y, X, and Low-Silica X: Observations of Thermally Induced Cation/Cluster Migration and the Resulting Effects on the Equilibrium Adsorption of Nitrogen", Chem. Mater., 12, pp. 3020-3031 (2000) presents a study of highly silver exchanged Y, X, and LSX zeolites. Nitrogen isotherms are determined for samples activated under various atmospheres, temperatures, and durations. Correlation is made to Ag cluster formation and migration.

BRIEF SUMMARY OF THE INVENTION

This invention relates to an improved crystalline zeolite material for use in effecting separation of argon from oxygen. The crystalline zeolitic material is an X-type zeolite having an argon/oxygen Henry's Law constant ratio (also called selectivity) measured at 23° C. greater than 1.05 and preferably greater than 1.15 and up to about 1.4 and at a silver exchange level of less than or equal to 70%. Unless otherwise noted, percent refers to percent of exchangeable cation sites in the zeolite. One method for preparing a silver exchanged X zeolite having a high argon/oxygen selectivity is to exchange the cations in an X zeolite first with lithium cations and then with silver cations to preselected levels. Proper ion exchange and calcination must be applied to the zeolite to achieve an argon/oxygen selectivity greater than 1. Preferably, a level of silver cation, based on total cation availability, from 20 to 70% is present in the X zeolite. More preferred levels of silver exchange in the lithium-exchanged X zeolite range from 30 to 60%. There are significant advantages associated with the crystalline zeolitic material described herein. These advantages include:

- an ability to provide for enhanced argon/oxygen selectivity ratios at silver concentration of less than or equal to 70% exchange,
- an ability to provide for efficient separation of argon from oxygen by use of a pressure or vacuum swing process,
- an ability to provide high purity oxygen via a pressure or vacuum swing process, and,
- lower cost.

BRIEF DESCRIPTION OF SEVERAL VIEWS OF THE DRAWINGS

FIG. 1 is a plot of argon/oxygen Henry's Law selectivity at 23° C. for four low silica X zeolites (Si/Al=1) (a) a 93% Li, 7% Na+K LSX zeolite; (b) 100% Na LSX; (c) 75% Na, 25% K LSX zeolite; and (d) 97% Ag, 3% Na+K LSX zeolite.

FIG. 2 is a plot of argon/oxygen Henry's Law selectivity at 23° C. for three series of different starting materials which have been silver exchanged to various degrees. The first is a 75% Na, 25% K LSX (low silica X). The second is a 93% Li, 7% Na+K LSX and the third is 95% Li, 5% Na LSX. The dotted lines are used to illustrate trends in selectivity with Ag exchange for the different starting materials.

DETAILED DESCRIPTION OF THE INVENTION

The crystalline zeolitic materials described herein are suited for the adsorption of argon from argon and oxygen containing mixtures. Many types of crystalline zeolitic materials are effective for separating nitrogen from oxygen, but not for the separation of argon from oxygen by adsorption techniques. The crystalline zeolitic adsorbents described herein and suited for the separation of argon from oxygen are comprised of a silver-exchanged lithium-X zeolite having an ion exchange composition of the form $Li_x$-$Ag_yM_zX$ where $0.85 \leq x+y \leq 1$, $0.2 \leq y \leq 0.7$, $0 \leq z \leq 0.15$ with M representing one or more cations, and x, y, and z representing fractions of total exchangeable sites in the zeolite. M can be a cationic form of one or more elements selected from alkaline or alkaline earth metals, rare earths, transition metals, or Group IIIA metals. M preferably is a cationic form of one or more elements selected from the group consisting of Na, K, Cs, Mg, La, Ce, Ca, Al, or Zn. Preferably, the Si/Al ratio is less than or equal to 1.25, and generally about 1. Lower Si/Al ratios have more cations sites/unit cell. More silver, thus, is required to achieve a common percentage level.

In the present disclosure, selectivity is defined generically as the degree of adsorption of one component relative to the degree of adsorption of another component on a given adsorbent. Selectivity of a first component over a second component is defined specifically herein as the ratio of the Henry's Law constant of the first component to the Henry's Law constant of the second component, where the Henry's Law constants are determined from the respective adsorption isotherms at a temperature of 23° C. The Henry's Law constant is defined as the initial slope of the pure gas adsorption isotherm at low adsorbate loading, where the isotherm is linear. The crystalline zeolitic materials are characterized in that they have a Henry's Law constant ratio for argon/oxygen (also called argon/oxygen selectivity) of at least 1.05, and preferably at least 1.15 and up to about 1.4, when measured at 23° C.

The adsorbents of the invention can be made from a base-type X zeolite (either powder or formed particles), which originally has sodium or sodium/potassium ions as the charge-compensating cation. The formed particles can contain clay or other binder or they may be binderless. Preferred X zeolites should have Si/Al ratio of equal to or less than 1.25. This material is then hydrated to a water content of 5 weight percent or greater. In preparing the zeolite, one effects a sequential exchange of the cations. First, the sodium or potassium ions, as the case may be, are replaced by lithium cations. Typically, this is effected by contacting the zeolite with an aqueous solution of a lithium salt, e.g., lithium chloride, lithium nitrate, or lithium acetate using known methods. Substantially all of the sodium or potassium ions are replaced to a level of great than 85%, preferably greater than 94% of exchangeable cations, using various contacting methods which are known in the art. Some of the original cations remain.

Once the sodium or potassium ions are substantially replaced by the lithium cations, the zeolite is contacted with an aqueous solution of a silver salt, e.g., silver nitrates, acetates, and the like, in either single or multiple contactings thereby replacing a portion of the lithium cations with silver cations. The level of replacement preferably ranges with the silver cations present in an amount from 20 to 70%, more preferably from 30 to 60% and most preferably from 35 to 45% of the replaceable cations for X zeolites. Thus, in the formula $Li_xAg_yM_z$, x+y ranges from 0.85 to 1; y ranges from 0.2 to 0.7, preferably 0.3 to 0.6, and more preferably from 0.35 to 0.45; and z ranges from 0.0 to 0.15, and more preferably from 0.0 to 0.06. Low silica X zeolites require about 10% more silver to be considered on an equivalent ratio. It is preferable to exchange Li first followed by silver exchange.

Once the appropriate level of cation exchange has been effected, the material is dried to bring the water concentration down to ~10 weight % or less. Drying can be accomplished in an oven which is swept preferably with dry, $CO_2$-free air. Heating may be continuous in a slow ramp or by stages, up to a temperature of 250° C., where the sample is held for 2 to several hours until the water concentration is below 10 weight %. It is then calcined at 350 to 450° C. preferably, 350 to 400° C., in dry, $CO_2$-free air to bring the water concentration down to less than 1 weight %. Other temperatures may be used outside the range but offer no significant advantages. In the practice of the invention here, it is preferred (but not limited) to pass dry, $CO_2$-free air through the zeolite adsorbent during calcination. Vacuum activation yields similar argon/oxygen selectivity, but is not practical for an industrial process. Low temperatures are preferred in order to prevent silver migration.

Pressure swing adsorption processes employing zeolitic materials known in the processes of prior art may be used here with the lithium/silver exchanged X zeolites. Typically, adsorption pressures range from 1 to 3 atmospheres absolute with desorption being effected at 0.1 to 1 atmospheres absolute. Temperatures during adsorption typically range from 20 to 70° C. A feed stream comprised of at least argon and oxygen with argon concentration of from 0.5 to 5% by volume may be used.

The following examples are provided to illustrate various embodiments of the invention and are not intended to restrict the scope thereof.

EXAMPLE 1

Preparation and Activation of 40% AgLiLSX

The starting material is a beaded 93% Li, 7% Na+K low silica X (LSX) (1.0 Si/Al ratio). The material is allowed to hydrate by leaving 20 mL in an open pan for 3 days. The starting solution is prepared by dissolving 5.096 grams of $AgNO_3$ into 12 mL of deionized water. The 20 mL of beads are poured into a 100 mL beaker which already contains the $AgNO_3$ solution. The volume of $AgNO_3$ solution required to just cover the beads is calculated to exchange $Ag^+$ onto 40% of the cation exchange sites in the zeolite, after correcting for the binder content of the beads, which is approximately 18 weight %. The bead and solution mixture is allowed to stand for 2 hours at room temperature. During this time there is essentially complete exchange of $Ag^+$ into the cation sites of the zeolite, because the zeolite has a higher affinity for $Ag^+$ than it has for $Li^+$.

After soaking for two hours, the solution is decanted from the beads. Then 15 mL of deionized water are added to the beads and placed in a 70° C. oven for 30 minutes. The rinse solution is drained and two additional 30 minute rinses with deionized water are performed. The beads are then allowed to air dry.

A portion of the adsorbent is activated by placing 9 mL into a 0.5 inch diameter steel tube which is placed into a standard tube furnace. A mixture of 80% nitrogen and 20% oxygen is sent through the bed at a rate of 385 mL/min while the following temperature program is run. The tube of adsorbent is held at 30° C. for 30 minutes and then the temperature is ramped up to 400° C. at a rate of 1.2° C./minute. The column of adsorbent is then held at 400° C. for 4 hours, after which it is allowed to cool to room temperature before being removed. After cooling, the column is transferred to a nitrogen-purged dry box for subsequent handling to prevent re-adsorption of water.

Measurement of the nitrogen, argon, and oxygen isotherms at 23° C. gave Henry's law constants of 5.36, 0.22, and 0.19, respectively. Consequently, the argon/oxygen Henry's law selectivity is 1.16.

EXAMPLE 2

Preparation of $Li_xAg_yM_z$-X Zeolites

The procedures of Example 1 were repeated except the % Ag cation exchange level was varied over a wide range. Exchange levels ranging from 0 to about 100% of unit cell cation capacity were conducted. FIGS. 1 and 2 represent graphically the results of these runs.

With regard to FIG. 1, the argon/oxygen selectivity for LiLSX, NaLSX, NaKLSX, and AgLSX are shown. Of this series, the LiLSX had the lowest selectivity for argon over oxygen. NaLSX and NaKLSX have slightly higher selectivities, but are still less than 1. The highly silver exchanged sample, AgLSX exhibits the highest selectivity, 1.21.

FIG. 2 shows the selectivities for a series of Ag exchanges starting with NaKLSX zeolites (where LSX represents low silica X zeolite, Si/Al=1.0). In all cases where Na or K were the starting cations and up to approximately 67% Ag exchange, there was no benefit in terms of efficiently separating argon from oxygen by adding Ag cations to the adsorbent. Only at the 70% level of Ag exchange did the selectivity ratio exceed 1, and only at the 97% Ag exchange level did the selectivity ratio reach 1.2. In contrast where the starting LSX zeolite was Li exchanged, and, then, subsequently exchanged with Ag, the selectivity ratio increased abruptly at a level of about 20% Ag and reached a selectivity of about 1.2 at a level of 30% Ag exchange. No further significant increase was noted. Similar behavior was exhibited by an X zeolite (Si/Al=1.25) which was Li exchanged and subsequently exchanged with Ag. Optimum cost benefits are found at the 30 to 45% Ag level.

Although not intending to be bound by any particular theory, it is believed that when Li cations are not present, Ag seems to site first in the sites which are not effective for Ar adsorption and it does not increase $Ar/O_2$ selectivity. Approximately 67% Ag exchange is required in order to see an increase in $Ar/O_2$ selectivity. Then, the selectivity does not exceed 1 until additional Ag exchange. In the presence of Li ions, the addition of Ag ions will increase Ar adsorption at much lower Ag loading and exhibit increased Ar selectivity. Other data represents a series of Ag exchanges performed on 93% Li starting material. Even with only 20% Ag exchange on the Li X zeolite, the selectivity was already higher than almost 60% Ag on Na+K starting material. By 30 to 40% Ag exchange, the $Ar/O_2$ selectivity had leveled off at around 1.2. The dashed lines are intended to illustrate these trends. An $Ar/O_2$ selectivity of at least 1.05 affords an ability to generate a high purity oxygen stream, e.g., one having an oxygen purity greater than 95 volume % by volume from a stream containing at least argon and oxygen.

What is claimed is:

1. A silver-exchanged X zeolite having an argon/oxygen Henry's Law constants ratio at 23° C. of at least 1.05 and a silver exchange level of less than or equal to 70%.

2. The X zeolite of claim 1 wherein the argon/oxygen Henry's Law constants ratio at 23° C. is at least 1.15 and up to about 1.4.

3. The X zeolite of claim 2 wherein the X zeolite has a silicon/aluminum ratio of less than or equal to 1.25.

4. The X zeolite of claim 3 wherein the cations in the X zeolite are comprised of Li and Ag and the ion exchange cation composition is of the form $Li_xAg_yM_zX$ where $0.85 \leq x+y \leq 1$, $0.2 \leq y \leq 0.7$, and $0.0 \leq z \leq 0.15$ with M representing one or more cations, and x, y, and z represent fractions of total exchangeable sites in the zeolite.

5. The X zeolite of claim 4 wherein y is 0.3 to 0.6.

6. The X zeolite of claim 5 wherein y is 0.35 to 0.45.

7. The X zeolite of claim 6 wherein z is 0.0 to 0.06.

8. The X zeolite of claim 7 wherein the silicon/aluminum ratio is approximately equal to 1.

9. The X zeolite of claim 8 wherein M is a cationic form of one or more elements selected from alkaline or alkaline earth metals, rare earths, transition metals or Group IIIA metals.

10. The X zeolite of claim 9 wherein M is a cationic form of one or more elements selected from the group consisting of Na, K, Cs, Mg, La, Ce, Ca, Al, or Zn.

11. The X zeolite of claim 10 wherein M is a combination of Na and K.

12. In a pressure swing or vacuum swing process for selectively adsorbing argon from oxygen in a gas mixture containing at least argon and oxygen wherein a gas mixture is contacted with an adsorbent in a zone under adsorption conditions and then passing the gas mixture less the adsorbed argon from the zone, the improvement which comprises using the X zeolite of claim 1 as the adsorbent.

13. The process of claim 12 wherein the gas mixture contains nitrogen, oxygen, and argon.

14. The process of claim 13 wherein the gas mixture is air.

15. The process of claim 12 wherein the cations in the X zeolite are comprised of Li and Ag and the ion exchange cation composition is of the form $Li_xAg_yM_zX$ where $0.85 \leq x+y \leq 1$, $0.2 \leq y \leq 0.7$, and $0.0 \leq z \leq 0.15$ with M representing one or more cations, and x, y, and z represent fractions of total exchangeable sites in the zeolite.

16. The process of claim 15 wherein y is 0.3 to 0.6.

17. The process of claim 16 wherein y is 0.35 to 0.45.

18. The process of claim 17 wherein z is 0.0 to 0.06.

19. The process of claim 18 wherein the silicon/aluminum ratio is approximately equal to 1.

20. The process of claim 19 wherein M is a cationic form of one or more elements selected from alkaline or alkaline earth metals, rare earths, transition metals or Group IIIA metals.

21. The process of claim 20 wherein M is a cationic form of one or more elements selected from the group consisting of Na, K, Cs, Mg, La, Ce, Ca, Al, or Zn.

22. The process of claim 21 wherein M is a combination of Na and K.

* * * * *